(12) United States Patent
Schulz et al.

(10) Patent No.: US 11,624,528 B2
(45) Date of Patent: Apr. 11, 2023

(54) FIELD CONFIGURATION OF COMMERCIAL WATER HEATERS

(71) Applicant: A. O. SMITH CORPORATION, Milwaukee, WI (US)

(72) Inventors: John Matthew Schulz, Nashville, TN (US); Carl Edward McDow, Albemarle, NC (US); Steven J. Wilcox, Elgin, SC (US); Michael Schultz, Camden, SC (US)

(73) Assignee: A. O. Smith Corporation, Milwaukee, WI (US)

( * ) Notice: Subject to any disclaimer, the term of this patent is extended or adjusted under 35 U.S.C. 154(b) by 0 days.

(21) Appl. No.: 17/809,249

(22) Filed: Jun. 27, 2022

(65) Prior Publication Data

US 2022/0325918 A1    Oct. 13, 2022

Related U.S. Application Data

(63) Continuation of application No. 16/934,383, filed on Jul. 21, 2020, now Pat. No. 11,371,753.

(60) Provisional application No. 62/877,088, filed on Jul. 22, 2019.

(51) Int. Cl.
| | |
|---|---|
| *F24H 9/20* | (2022.01) |
| *H04B 5/00* | (2006.01) |
| *G06F 16/955* | (2019.01) |
| *G06Q 30/0601* | (2023.01) |
| *G06Q 20/32* | (2012.01) |

(52) U.S. Cl.
CPC ....... *F24H 9/2035* (2013.01); *G06F 16/9554* (2019.01); *G06Q 20/322* (2013.01); *G06Q 30/0621* (2013.01); *G05B 2219/50333* (2013.01)

(58) Field of Classification Search
CPC ............... F24H 9/2035; G06F 16/9554; G05B 2219/50333
See application file for complete search history.

(56) References Cited

U.S. PATENT DOCUMENTS

| | | | |
|---|---|---|---|
| 5,348,780 A | 9/1994 | Boggs et al. | |
| 5,442,997 A * | 8/1995 | Branz | A47J 27/16 99/533 |
| 6,375,087 B1 * | 4/2002 | Day | G05D 23/1904 122/447 |
| 2008/0238633 A1 | 10/2008 | Siebert | |

(Continued)

FOREIGN PATENT DOCUMENTS

| | | |
|---|---|---|
| CN | 206724486 U | 12/2017 |
| WO | 2016120640 A1 | 8/2016 |

OTHER PUBLICATIONS

Extended European Search Report issued by the European Patent Office for Application No. 20187185.2 dated Sep. 23, 2020 (8 pages).

(Continued)

*Primary Examiner* — Steven S Anderson, II
(74) *Attorney, Agent, or Firm* — Michael Best & Friedrich LLP

(57) ABSTRACT

A system and method for configuring a water heater. The method includes capturing, with a mobile device a scannable feature of a rating plate and receiving, with the mobile device, an input indicative of a configuration selection. The method further includes configuring, with the mobile device, the water heater based on the configuration selection.

10 Claims, 7 Drawing Sheets

(56) References Cited

U.S. PATENT DOCUMENTS

| | | |
|---|---|---|
| 2011/0272132 A1 | 11/2011 | Koch et al. |
| 2015/0032641 A1* | 1/2015 | Ding .................... G06Q 30/016 |
| | | 705/304 |
| 2015/0276268 A1 | 10/2015 | Hazzard et al. |
| 2016/0138821 A1 | 5/2016 | Shaull et al. |
| 2017/0279876 A1* | 9/2017 | Prasad .................... H04L 67/34 |
| 2018/0119975 A1 | 5/2018 | Park et al. |

OTHER PUBLICATIONS

Mitchell, Ruth and Frank Windsor. "Q&A With Frank Windsor, COO of Rinnai." PHCP Pros, Jul. 8, 2018, http://www.phcppros.com/articles/7800-q-a-with-frank-windsor-coo-of-rinnai (Year: 2018).

* cited by examiner

FIELD CONFIGURATION OF COMMERCIAL WATER HEATERS

RELATED APPLICATIONS

This application is a continuation of U.S. patent application Ser. No. 16/934,383, filed on Jul. 21, 2020, which claims priority to U.S. Provisional Patent Application No. 62/877,088, filed Jul. 22, 2019, the entire content of which is hereby incorporated by reference for all that is taught.

FIELD

Embodiments relate to water heaters, and more specifically, configuring water heaters in a wholesale environment.

SUMMARY

Commercial gas water heaters are offered for sale in a variety of storage and input sizes, as well as specific models for Natural or LP gas. Wholesalers keep several models in their inventory in an attempt to have the correct size water heater in the event of an emergency replacement. However, wholesalers regularly do not have all models in stock, as the inventory carrying cost is high, and some model sizes and fuel types do not have the sales volume to justify the inventory expense. Accordingly, there is a possibility of a specific model water heater failing to be in stock, potentially leaving a consumer in a difficult position.

Additionally, wholesalers may struggle to maintain the correct inventory levels for the water heater configurations needed to have the unit in stock when they receive an order. Approximately 75% of the commercial gas market is for replacement, and the wholesaler who has the right model in stock typically gets the sale. Accordingly, there is a need to assist wholesalers with maintaining inventory levels based on water heater models and configurations.

Embodiments disclosed herein will allow wholesalers to maintain only a few core units in stock and configure them as needed once an order has been received. Maintaining a few core units reduces complexity in the process of purchasing water heaters, as well as reduces the cost for both buyers and wholesalers.

Accordingly, embodiments described herein provide systems and methods for configuring commercial water heaters. One embodiment includes a system for configuring a water heater, the system comprising a rating plate coupled to the water tank, and a mobile device. The mobile device is configured to capture a scannable feature of the rating plate, receive an input indicative of a configuration selection, and configure the water heater based on the configuration selection.

In some embodiments, in response to capturing the scannable feature, the mobile device is further configured to display a plurality of configurations associated with the water heater. In some embodiments, in response to receiving the input indicative of the configuration selection, the mobile device is further configured to generate an invoice based on the configuration selection. In some embodiments, the scannable feature is one selected from a group consisting of a QR code and an NFC tag. In some embodiments, configuring the water heater includes the mobile device communicating with a controller of the water heater using near field communication. In some embodiments, the mobile device is further configured to access an application associated with the water tank. In some embodiments, the water tank is stored in a wholesale environment. In some embodiments, configuring the water heater includes configuring the water heater to a British Thermal Unit input. In some embodiments, the water heater is one selected from a plurality of water heater base units. In some embodiments, each of the plurality of water heater base units has a unique plurality of possible configurations.

Another embodiment is directed to a method for configuring a water heater. The method includes capturing, with a mobile device, a scannable feature of a rating plate, receiving, with the mobile device, an input indicative of a configuration selection, and configuring, with the mobile device, the water heater based on the configuration selection.

In some embodiments, the method includes displaying, with the mobile device and in response to the scannable feature, a plurality of configurations associated with the water heater. In some embodiments, in response to receiving the input indicative of the configuration selection, the method includes generating, with the mobile device, an invoice based on the configuration selection. In some embodiments, the scannable feature is one selected from a group consisting of a QR code and an NFC tag. In some embodiments, configuring the water heater includes the mobile device communicating with a controller of the water heater using near field communication. In some embodiment, prior to capturing the scannable feature, the method includes accessing, with the mobile device, an application associated with the water heater. In some embodiments, configuring the water heater includes configuring the water heater to a British Thermal Unit input. In some embodiments, configuring the water heater includes transmitting software from the mobile device to the water heater. In some embodiments, the software includes control information for at least one selected from a group consisting of a gas valve of the water heater and a blower of the water heater. In some embodiments, the water heater is one selected from a plurality of water heater base units.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
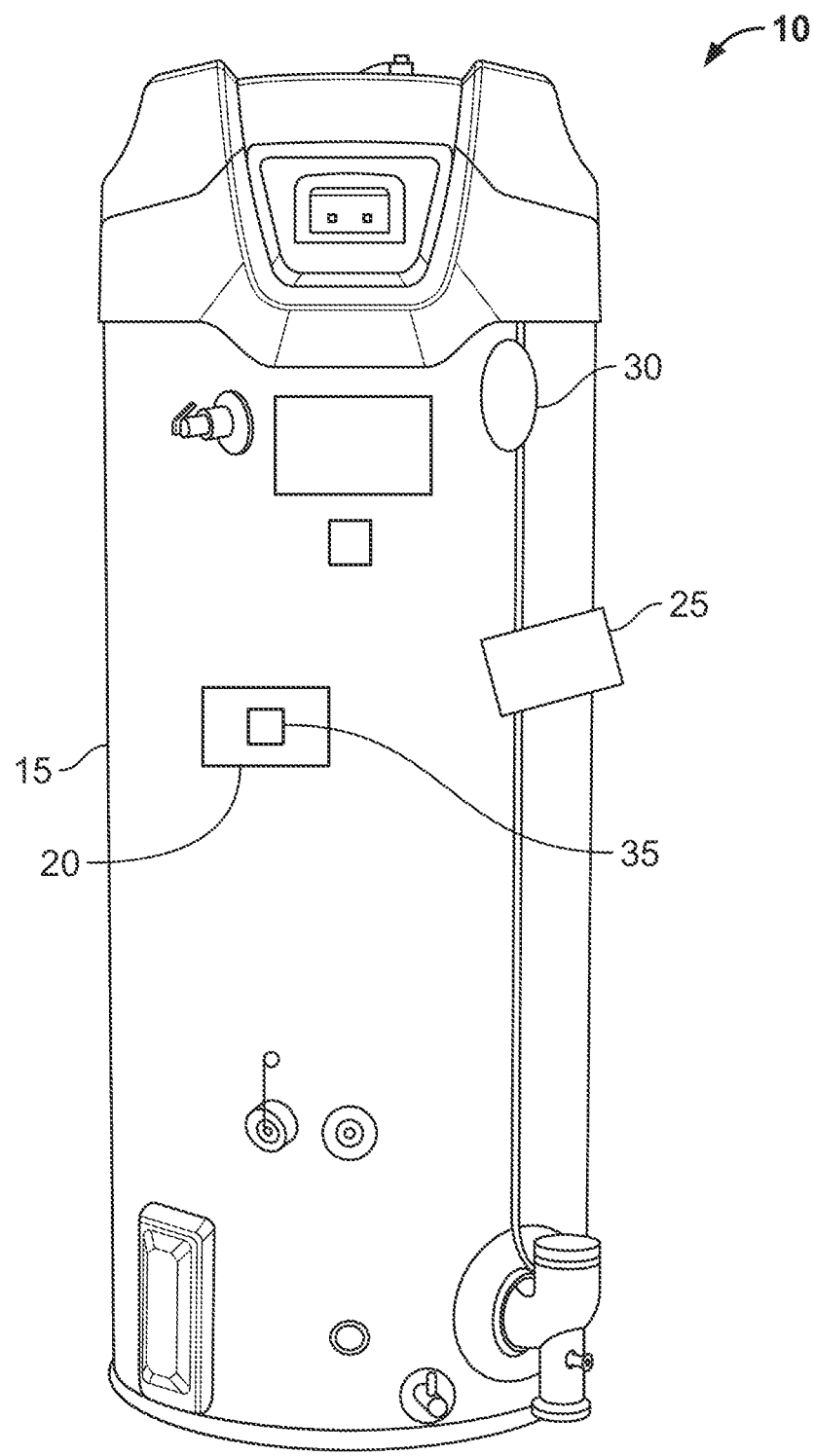
FIG. 1 is a front view of a water heater according to some embodiments.

FIG. 1 illustrates a water heater 10 according to some embodiments. As illustrated, the water heater 10 may include a tank 15, a primary rating plate 20, and a first transceiver 30. The primary rating plate 20 may be transfixed to the tank 15 and may contain information such as a model number, a capacity of the tank 15, an accepted gas type, a British Thermal Unit (BTU) input, an inlet size, a rated P.S.I. pressure, and the like. A plurality of adjacent rating plates 25 may also be removably coupled to the tank 15, as detailed further below. The plurality of adjacent rating plates 25 may contain one of a plurality of configurations for the water heater 10, and may correspond to configurations shown on a mobile computing device 50 (see FIG. 2). The primary rating plate 20 may include a scannable feature 35 (e.g., a QR code, a barcode, and/or the like) that may be read by a mobile computing device 50. In some embodiments, the water heater 10 is one of a plurality of sizes. In some embodiments, the water heater 10 includes a tankless feature.

The first transceiver 30 may be an NFC device, a Bluetooth transmitter, a Wi-Fi transmitter, or the like. The first transceiver 30 may communicate with the mobile computing device 50 to provide possible configurations of the water heater 10. Additionally, the first transceiver 30 may be coupled to a controller within the water heater 10 and allow the controller of the water heater 10 to communicate with the mobile computing device 50. In some embodiments, prior to configuration, the water heater 10 is inoperable.

The water heater 10 may be one of a plurality of water heater base units stored in a wholesale environment. Each water heater base unit may include a different size tank 15 and may have its own unique plurality of possible configurations, as detailed further below. Each water heater base unit may be compatible with different British Thermal Unit (BTU) inputs.

Figure 2:
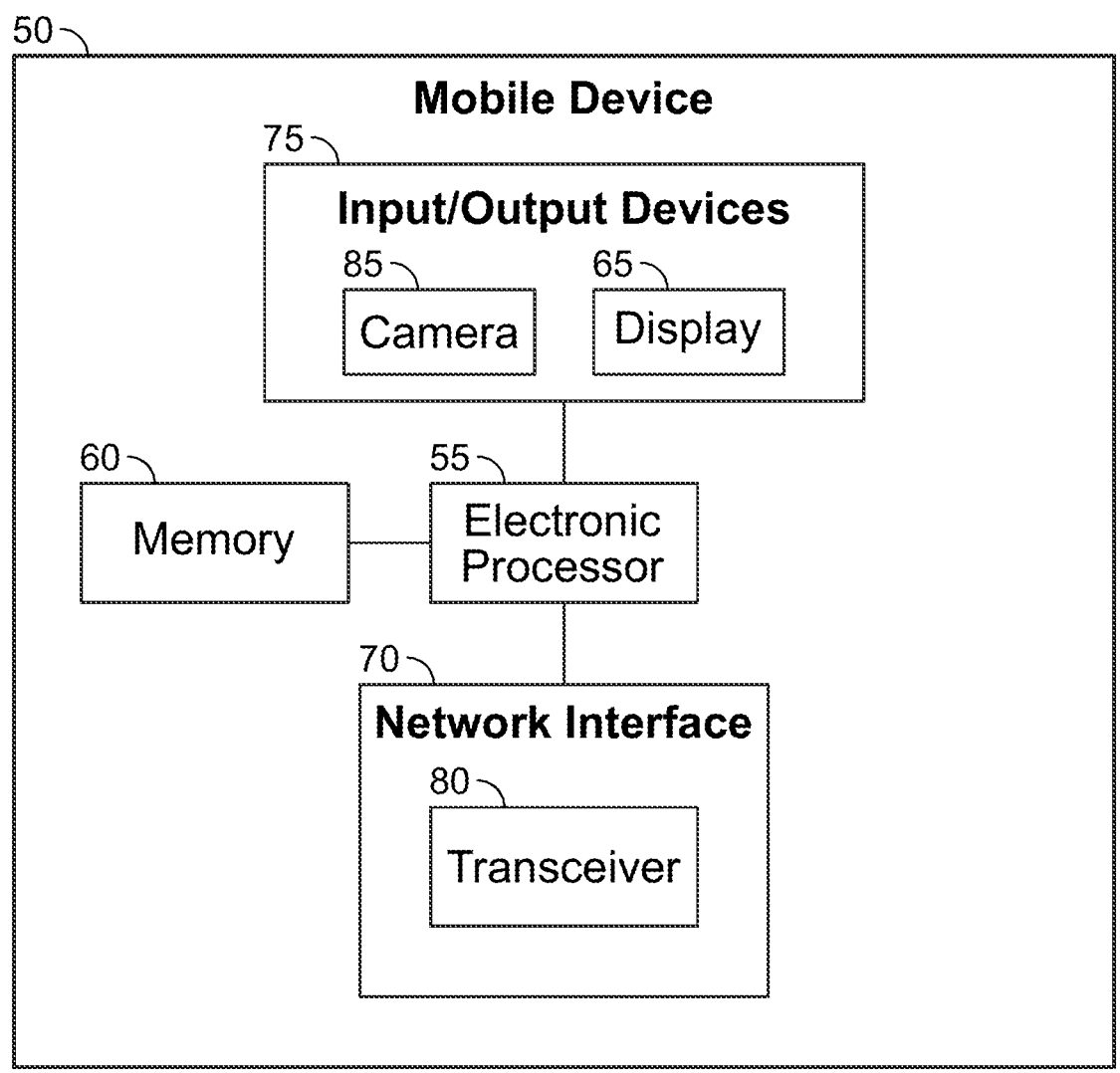
FIG. 2 is a block diagram of a mobile device according to some embodiments.

FIG. 2 illustrates the mobile computing device 50 (e.g., mobile device) according to one embodiment. The mobile computing device 50 may be, for example, a tablet, a smartphone, a personal computer, and/or the like. In the illustrated embodiment, the mobile computing device 50 includes an electronic processor 55 (e.g., a microprocessor, a microcontroller, a controller, or another suitable programmable device), a first memory 60, a display 65, a network interface 70, and input/output devices 75.

The first memory 60 may include read only memory (ROM), random access memory (RAM), other non-transitory computer-readable media, or a combination thereof. The electronic processor 55 may be configured to receive instructions and data from the first memory 60 and execute, among other things, instructions related to operation of the mobile computing device 50. In particular, the electronic processor 55 executes instructions stored in the first memory 60 to perform the methods described herein.

The mobile computing device 50 uses network interface 70 to communicate with a network, such as, for example, a Personal Area Network (PAN), a Local Area Network (LAN), a Wireless Local Area Network (WLAN), a WiFi network, the Internet, a Bluetooth network, and the like. The network interface 70 may include a second transceiver 80 configured to transmit and receive signals from other devices within the same network. For example, the electronic processor 55 may communicate with an external server using the second transceiver 80. The second transceiver 80 may also communicate with the first transceiver 30 of the water heater 10.

The input/output devices 75 may include a combination of digital and analog input or output devices required to achieve desired functions of the mobile computing device 50. For example, alongside a camera 85 and a display 65, the input/output devices 75 may include a touch screen, a speaker, buttons, and the like, to output information or receive user inputs regarding the water heater 10. The electronic processor 55 controls the input/output devices 75 to receive inputs related to the water heater 10 and provide outputs, such as providing possible configurations of the water heater 10 on the display 65. For example, the electronic processor 55 may receive, from the camera 85, a picture of the scannable feature 35. The electronic processor 55 uses data recovered from the scannable feature 35 to determine possible configurations of the water heater 10, and provides the possible configurations using the display 65. In some embodiments, the electronic processor 55 receives, using a touchscreen of the input/output devices 75 or the like, a selection of one of the possible configurations of the water heater 10. The electronic processor 55 may further communicate, using the second transceiver 80, configuration information to the first transceiver 30 of the water heater 10.

Figure 3:
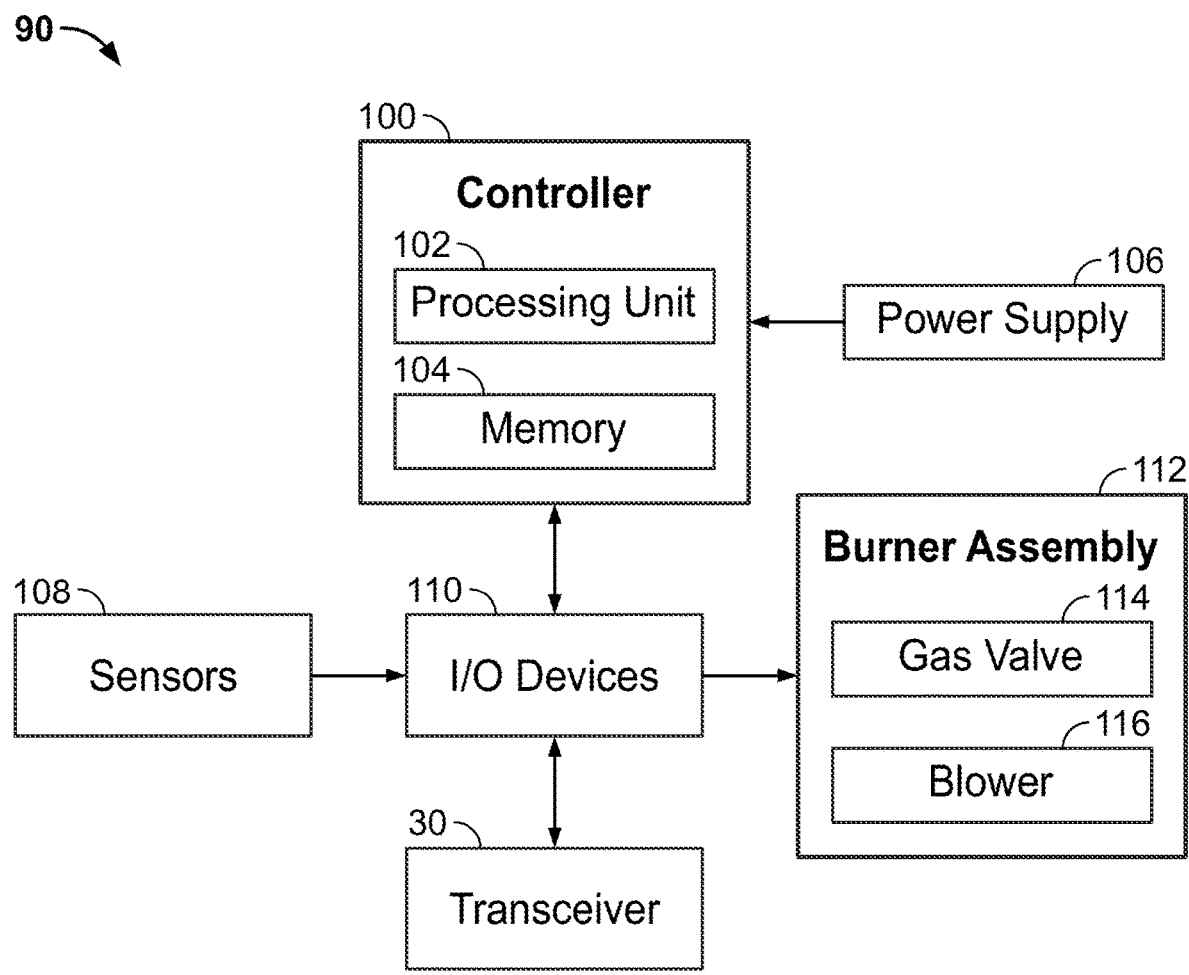
FIG. 3 is a block diagram of the water heater of FIG. 1 according to some embodiments.

FIG. 3 illustrates a control system 90 for the water heater 10 according to some embodiments. The control system 90 may include a controller 100, a power supply 106, one or more sensors 108, heater input/output (I/O) devices 110, a burner assembly 112, and the transceiver 30. As illustrated, in some embodiments the controller 100 includes a processing unit 102 and a second memory 104. The processing unit 102 may be a microprocessor, a microcontroller, a controller, or another suitable programmable device. The second memory 104 may include read only memory (ROM), random access memory (RAM), other non-transitory computer-readable media, or a combination thereof. The controller 100 controls the burner assembly 112 based on information stored in the second memory 104. The controller 100 receives power from the power supply 106. The power supply 106 may be an AC power source. In some embodiments, the power supply 106 provides 120 VAC at a frequency of approximately 50 Hz to approximately 60 Hz. In another embodiment, the power supply 106 provides 220 VAC at a frequency of approximately 50 Hz to approximately 60 Hz.

The controller 100 may receive information from the one or more sensors 108 via the heater input/output devices 110. The one or more sensors 108 may be, for example, a plurality of temperature sensors related to the burner assembly 112, the fluid stored in the water tank 15, or a combination thereof. The controller 100 may further control the burner assembly 112 via the heater input/output devices 110. The burner assembly 112 may include a gas valve 114 and a blower 116. The gas valve 114 may be configured to control an amount of gas provided to burner assembly 112. The burner assembly 112 may use the gas to create a flame. Accordingly, a greater volume of gas provided by the gas valve 114 results in a larger flame. The blower 116 may be configured to vent combustion gases from the water heater 10. For example, the blower 116 may provide combustion air for the flame from an outside environment. The blower 116 may also vent combustion air to a location outside the water heater 10. In some embodiments, the burner assembly 112 may include additional components to assist with operation of the water heater 10. In some embodiments, the controller 100 controls operation of the burner assembly 112 based on signals received by the first transceiver 30. The controller 100 may also receive signals from the mobile computing device 50 via the first transceiver 30 to control configuration of the water heater 10.

Figure 4:
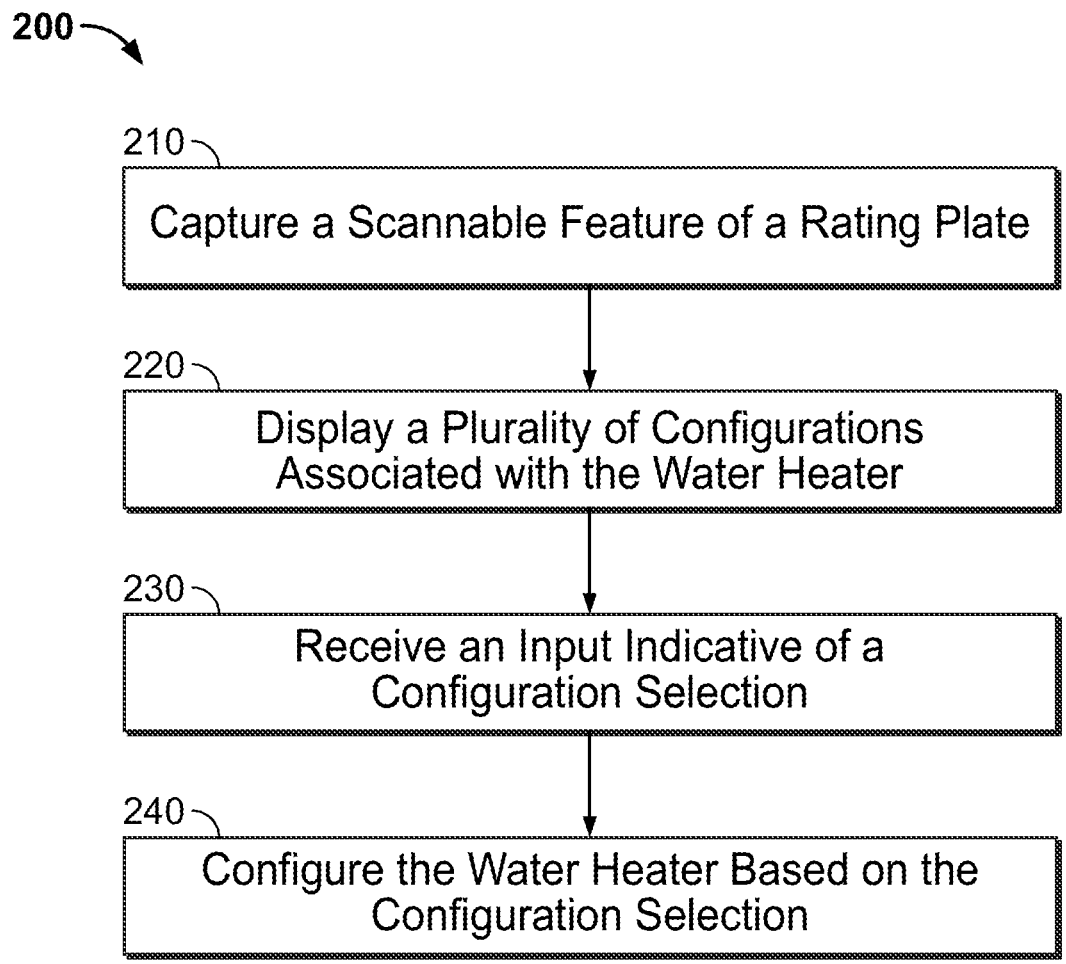
FIG. 4 is a flow chart of a method performed by the mobile device of FIG. 2 according to some embodiments.
Figure 5A:
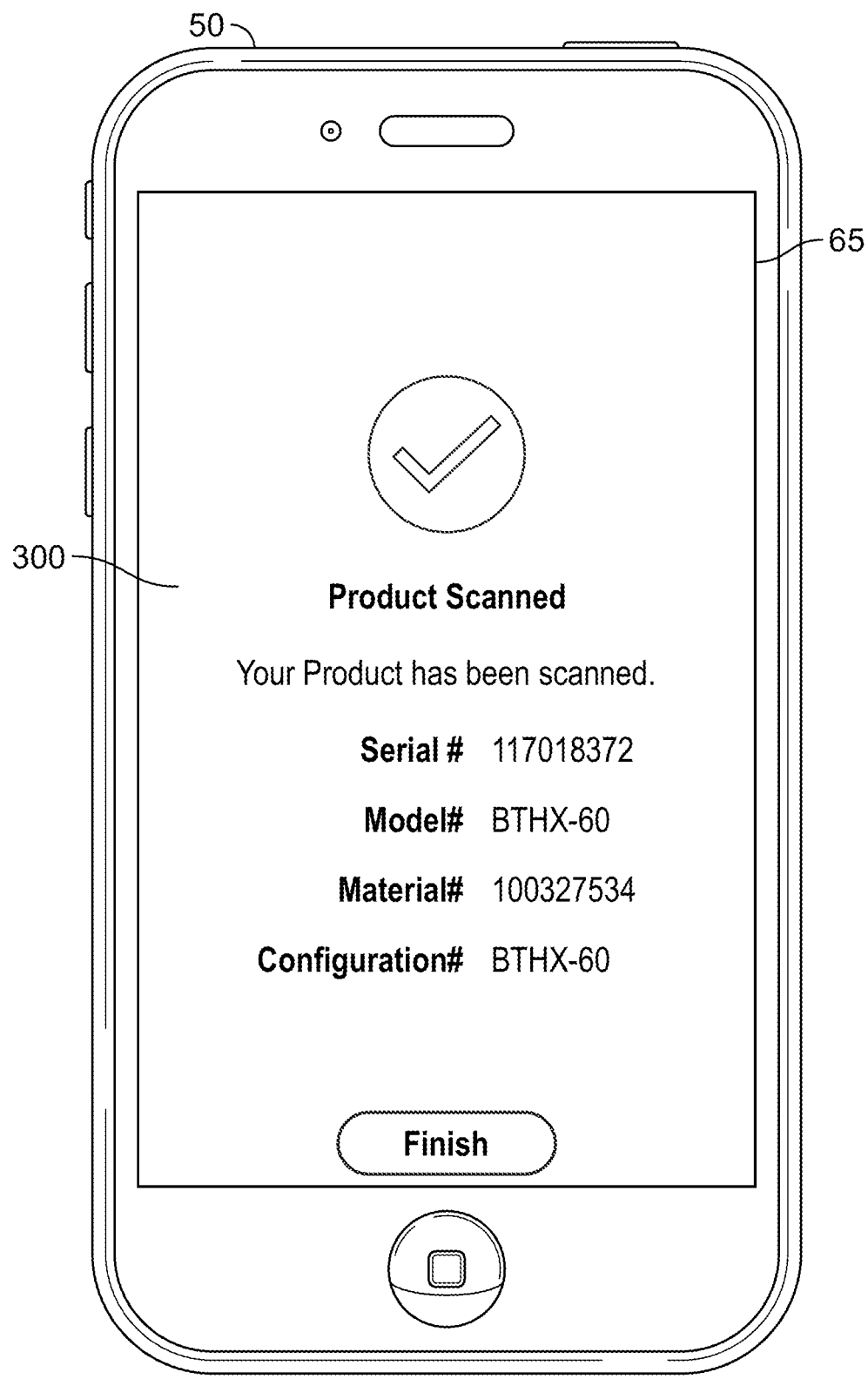
FIGS. 5A-5C illustrate graphical user interfaces shown on the mobile device of FIG. 2 according to some embodiments.

FIG. 4 is a flow chart of a method 200, or process 200, for configuring a water heater 10, according to some embodiments. It should be understood that the order of the steps disclosed in method 200 could vary. Furthermore, additional steps may be added to the sequence and not all of the steps may be required. At block 210, the mobile computing device 50 captures the scannable feature 35 of the primary rating plate 20. For example, the electronic processor 55, using the camera 85, scans a QR code situated on the primary rating plate 20. In some embodiments, the electronic processor 55 communicates with an NFC device, such as the first transceiver 30, to receive information related to configuration of the water heater 10. Prior to capturing the scannable feature 35, a user of the mobile computing device 50 may access an application associated with the water heater 10. The application may be, for example, a mobile application associated with a manufacturer of the water heater 10, an application associated with the retailer at which the water heater 10 is being sold, or the like. Additionally, following capturing the scannable feature 35, the mobile computing device 50 may provide a scanning confirmation on the display 65. For example, FIG. 5A illustrates a user interface 300 on the display 65. The user interface 300 provides a scanning confirmation illustrating a successful capture of the scannable feature 35. The scanning confirmation may include, for example, a serial number of the water heater 10, a model number of the water heater 10, a material number of the water heater 10, and a current configuration of the water heater 10.

Figure 5B:
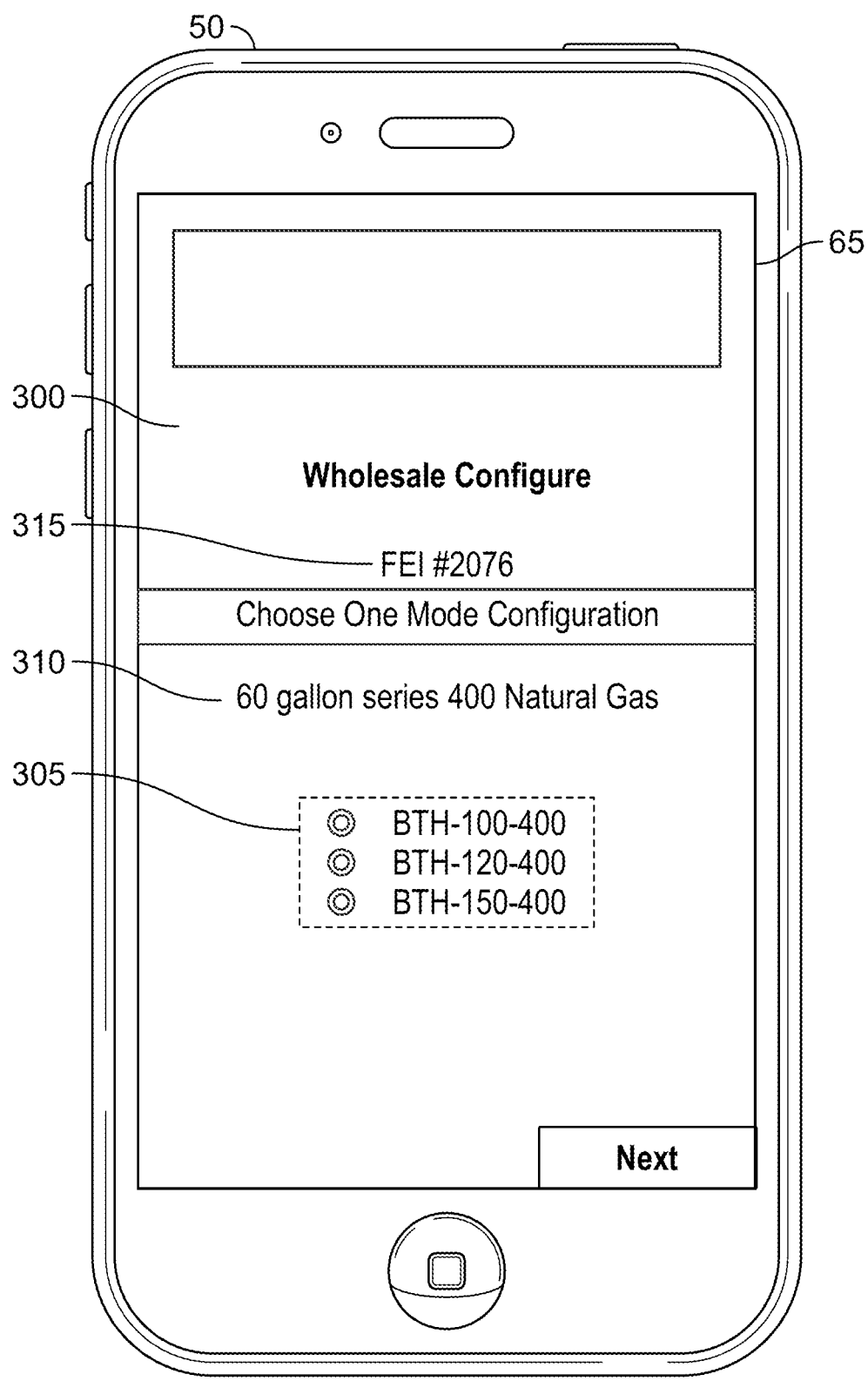

At block 220, the mobile computing device 50 provides a plurality of configurations associated with the water heater 10 on the display 65. For example, FIG. 5B illustrates a user interface 300 providing a plurality of configurations 305 that correspond with the water heater 10, shown by water heater label 310. The water heater label 310 may indicate what type of base unit from a plurality of base units the water heater 10 is. For example, the water heater 10 may be one selected from a plurality of water heater base units. In some embodiments, the water heater serial number 315 may also be provided on the user interface 300. The plurality of configurations 305 may include possible configurations associated with the given water heater 10. Each configuration may indicate a BTU input for the water heater 10. Although three configurations are shown in the plurality of configurations 305, any number of configurations may be provided based on the capabilities of the water heater 10. For example, a second water heater 10 of a different type of base unit may have five possible configurations.

Returning to FIG. 4, at block 230 the mobile computing device 50 receives an input indicative of a configuration selection. For example, a user of the mobile computing device 50 selects one of the plurality of configurations 305 using a touchscreen of the display 65. At block 240, the water heater 10 is configured based on the configuration selection. The mobile computing device 50 may transmit configuration information to the first transceiver 30 of the water heater 10 using the second transceiver 80. The configuration information may be transmitted using NFC technology, and may configure the BTU input for the water heater 10. Through the use of, for example, NFC technology and QR codes, the water heater 10 is able to remain in its packaging while being configured, and power to the water heater 10 is not required while being configured.

In some embodiments, the configuration information is software transmitted from the mobile computing device 50 to the controller 100 of the water heater 10. For example, the configuration information is transmitted from the second transceiver 80 of the mobile computing device 50 to the first transceiver 30 of the water heater 10. In some embodiments, the configuration information indicates the firing rate for the burner assembly 112 of the water heater 10. For example, the configuration information may include control information for at least one selected from a group consisting of the gas valve 114 and the blower 116. For example, the configuration information may include instructions regarding operation of the water heater 10, such as operation of the gas valve 114 to allow a specified amount of gas to a flame in the burner assembly 112. In some embodiments, the configuration information includes instructions regarding the operating rate (e.g., blower rate) of the blower 116. The configuration information may further include software instruction the controller 100 to operate the water heater 10 at a BTU input that aligns with the selected configuration.

Figure 5C:
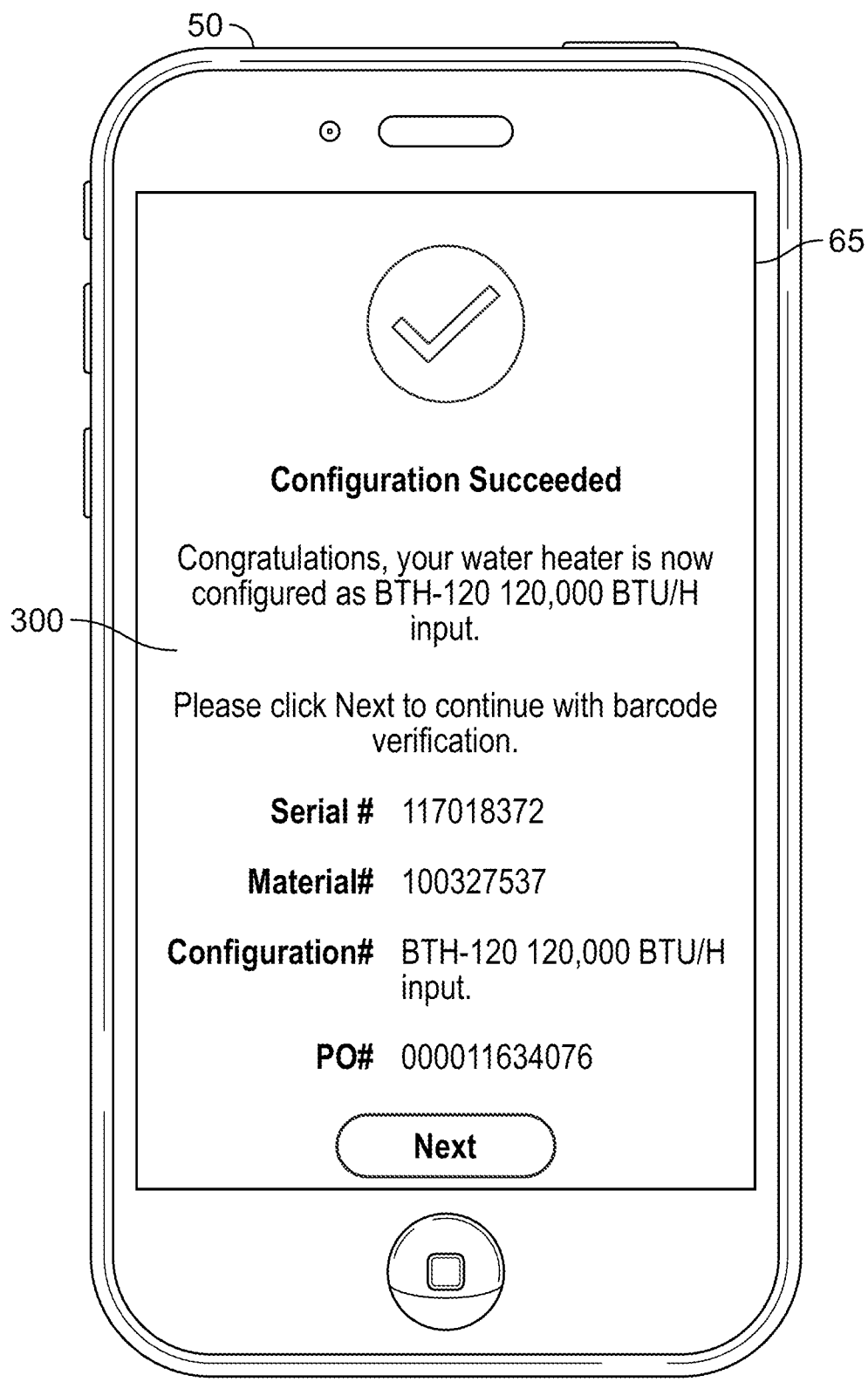

In some embodiments, following configuration of the water heater 10, the mobile computing device 50 may provide the correct adjacent rating plate 25. The adjacent rating plate 25 may be indicative of the selected configuration of the water heater 10 and may replace the primary rating plate 20. Following configuration of the water heater 10, the mobile computing device 50 may provide a configuration confirmation using the display 65. For example, FIG. 5C illustrates the user interface 300 displaying a configuration confirmation. The configuration confirmation may include the updated configuration of the water heater 10, the serial number of the water heater 10, the material number of the water heater 10, and a purchase order (PO) number for the purchase of the water heater 10. In some embodiments, following configuration of the water heater 10, the mobile computing device 50 provides a generated invoice based on the selected configuration. The generated invoice may accompany a base invoice associated with the selected water heater 10.

Thus, the application provides, among other things, a system and method for configuring a water heater. Various features and advantages of the application are set forth in the following claims.

What is claimed is:

1. A method for configuring a water heater, the method comprising:

receiving an inoperable water heater base unit into a wholesale inventory, the water heater base unit being capable of being configured into a plurality of configurations;

receiving an order for a water heater corresponding to one of the plurality of configurations;

using a mobile computing device, establishing a communication link with a controller of the water heater base unit;

selecting, on the mobile device, said one of the plurality of configurations; and transmitting configuration information corresponding to said one of the plurality of configurations from the mobile device to the controller by way of the communication link, wherein the configuration information converts the inoperable water heater base unit into a water heater capable of operating only in said one of the plurality of configurations.

2. The method of claim 1, wherein the mobile computing device is a tablet, a smartphone, or a personal computer.

3. The method of claim 1, wherein the plurality of configurations includes a plurality of input ratings.

4. The method of claim 1, wherein the communication link between the mobile computing device and the controller is established using NFC technology.

5. The method of claim 1, further comprising applying to the water heater a rating plate corresponding to said one of the plurality of configurations.

6. The method of claim 5, wherein the rating plate is one of a plurality of rating plates provided with the water heater base unit, each one of the plurality of rating plates corresponding to one of the plurality of configurations.

7. The method of claim 1, further comprising generating an invoice corresponding to said one of the plurality of configurations.

8. The method of claim 1, wherein the water heater remains in packaging during the steps of establishing the communication link, selecting said one of the configurations, and transmitting configuration information.

9. The method of claim 1, wherein the water heater is unpowered during the steps of establishing the communication link, selecting said one of the configurations, and transmitting configuration information.

10. The method of claim 1, further comprising receiving a configuration confirmation on the mobile computing unit after successfully transmitting configuration information to the controller.

* * * * *